United States Patent

Takahashi

(10) Patent No.: US 7,504,758 B2
(45) Date of Patent: Mar. 17, 2009

(54) ELECTROSTATIC ACTUATOR AND METHOD FOR DRIVING ELECTROSTATIC ACTUATOR

(75) Inventor: Isao Takahashi, Miyagi-ken (JP)

(73) Assignee: ALPS Electric Co., Ltd. (JP)

( * ) Notice: Subject to any disclaimer, the term of this patent is extended or adjusted under 35 U.S.C. 154(b) by 0 days.

(21) Appl. No.: 12/106,221

(22) Filed: Apr. 18, 2008

(65) Prior Publication Data

US 2008/0211343 A1 Sep. 4, 2008

Related U.S. Application Data

(63) Continuation of application No. PCT/JP2006/321427, filed on Oct. 26, 2006.

(30) Foreign Application Priority Data

Oct. 27, 2005 (JP) .............................. 2005-312512

(51) Int. Cl.
 *H02N 1/00* (2006.01)
(52) U.S. Cl. ...................... 310/309; 318/116
(58) Field of Classification Search ................. 310/309; 318/116, 135
See application file for complete search history.

(56) References Cited

U.S. PATENT DOCUMENTS

| | | | | |
|---|---|---|---|---|
| 5,055,731 | A | * | 10/1991 | Nihei et al. |
| 5,378,954 | A | * | 1/1995 | Higuchi et al. |
| 5,780,948 | A | * | 7/1998 | Lee et al. |
| 5,869,916 | A | * | 2/1999 | Suzuki et al. |
| 5,914,553 | A | * | 6/1999 | Adams et al. ................ 310/309 |
| 5,986,381 | A | * | 11/1999 | Hoen et al. |
| 6,424,504 | B1 | * | 7/2002 | Abe et al. |
| 6,536,280 | B1 | * | 3/2003 | Carley |
| 6,713,939 | B2 | * | 3/2004 | Kasahara |
| 6,781,279 | B2 | * | 8/2004 | Lee et al. |
| 6,853,517 | B2 | * | 2/2005 | Hirano et al. |
| 7,208,857 | B2 | * | 4/2007 | Fasen |
| 7,211,924 | B2 | * | 5/2007 | Furusho et al. |
| 7,265,476 | B1 | * | 9/2007 | Abushagur et al. |
| 2005/0062361 | A1 | * | 3/2005 | Harley et al. ................ 310/309 |
| 2007/0024155 | A1 | * | 2/2007 | Calvet et al. ................ 310/309 |

FOREIGN PATENT DOCUMENTS

| | | |
|---|---|---|
| JP | 7-16599 | 3/1995 |
| JP | 8-186988 | 7/1996 |
| JP | 9-51685 | 2/1997 |

OTHER PUBLICATIONS

International Search Report dated Jan. 16, 2007 from corresponding International Application No. PCT/JP2006/321427.

* cited by examiner

*Primary Examiner*—Burton Mullins
(74) *Attorney, Agent, or Firm*—Beyer Law Group LLP

(57) ABSTRACT

An electrostatic actuator having a simple structure including a reduced number of systems that supply driving voltages and a method for driving the electrostatic actuator. Stator electrodes 23 including a plurality of electrical systems (A-phase electrodes, B-phase electrodes, and C-phase electrodes) are repeatedly disposed in a predetermined order in the moving direction. A pitch (cycle length) 3P1 of the stator electrodes 23 that forms the electrical systems of the same type in the moving direction is equal to a pitch c of the mover electrodes 33 in the moving direction, and the mover includes at least two types of mover electrodes $33a1$ and $33b1$ having different lengths.

5 Claims, 6 Drawing Sheets

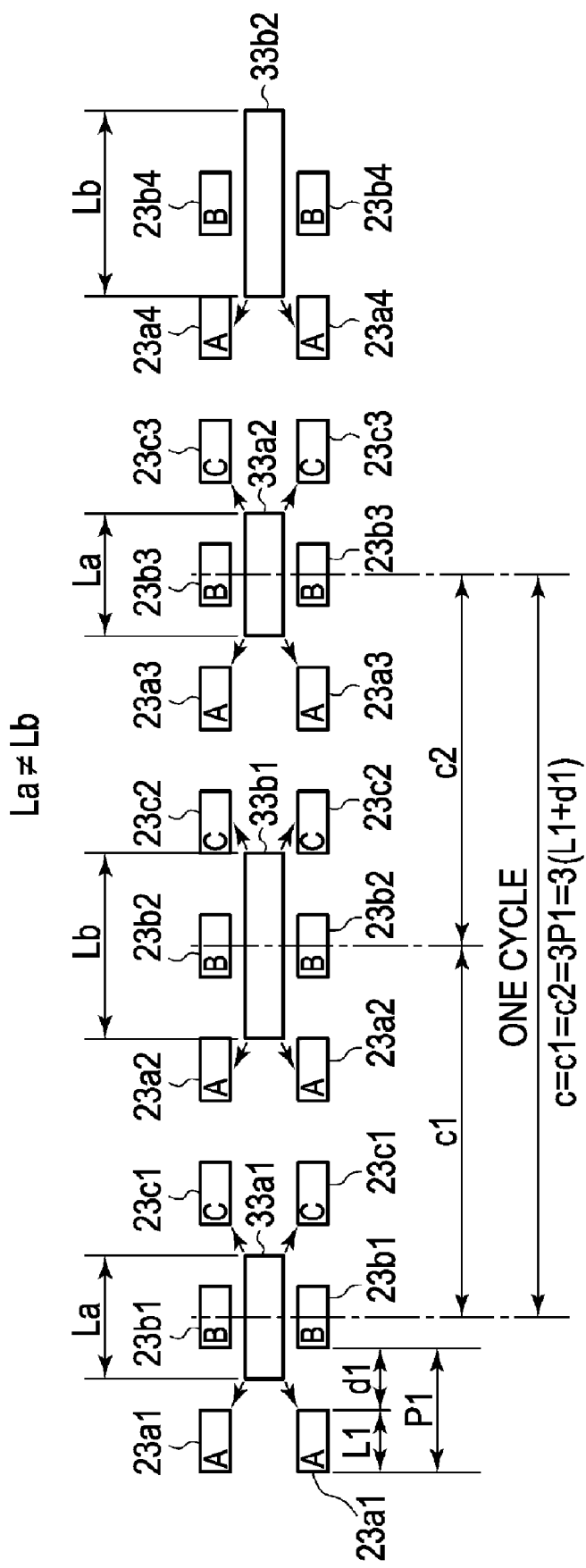

ELECTROSTATIC ACTUATOR AND METHOD FOR DRIVING ELECTROSTATIC ACTUATOR

CROSS REFERENCE OF RELATED APPLICATION

This is a continuation of International Application No. PCT/JP2006/321427, filed Oct. 26, 2006, which is incorporated herein by reference in its entirety.

TECHNICAL FIELD

The present invention relates to an electrostatic actuator that moves a mover using an electrostatic attractive force (a Coulomb's force) and, in particular, to an electrostatic actuator having a reduced number of electrical systems and having a simple structure and a method for driving the electrostatic actuator.

BACKGROUND ART

Some existing electrostatic actuators have a structure in which electrodes of a stator and electrodes of a mover (a movable element) are arranged at an even pitch (refer to, for example, Patent Document 1).

In contrast, some existing electrostatic actuators have a structure in which electrodes of at least one of a stator and a mover is arranged at an uneven pitch (refer to, for example, Patent Document 2).

[Patent Document 1] Japanese Unexamined Utility Model Registration Application Publication No. 07-16599

[Patent Document 2] Japanese Unexamined Patent Application Publication No. 08-186988

DISCLOSURE OF INVENTION

Problems to be Solved by the Invention

However, the electrostatic actuator of an even pitch type described in Patent Document 1 has a structure in which the number of electrical systems (the number of phases) is six (a sum of three phases of the mover: an "a" phase, a "b" phase and a "c" phase and three phases of the stator: an "A" phase, a "B" phase and a "C" phase). As described above, since an existing electrostatic actuator includes a large number of electrical systems, the structure of a control circuit and the structure of wirings are disadvantageously complicated. Furthermore, since a negative power supply is required in addition to a positive power supply, it is difficult to reduce the size and the costs of the electrostatic actuator.

In addition, like the electrostatic actuator of an even pitch type, the electrostatic actuator of an uneven pitch type described in Patent Document 2 has a six-phase electrode structure. Therefore, it is difficult to simplify the structure of a control circuit and the structure of wirings.

Furthermore, in order to stop the operation of the mover, the potentials of the electrodes of the mover and the stator need to be set to "0". In such a case, the mover cannot be maintained or fixed to the current position.

To solve the above-described problems, it is an object of the present invention to provide an electrostatic actuator having a reduced number of electrical systems and having a simple structure and a method for driving the electrostatic actuator.

Means for Solving the Problems

According to the present invention, an electrostatic actuator includes a stator having a plurality of stator electrodes arranged thereon, a mover having a plurality of mover electrodes arranged thereon, where the mover moves in the moving direction with a surface thereof facing a surface of the stator, a power feeding unit for applying a predetermined driving voltage to the stator electrodes, and a control unit for controlling the power feeding unit. The stator electrodes include a plurality of electrical systems repeatedly arranged in a predetermined order in the moving direction. A pitch (cycle length) of the stator electrodes forming the electrical systems of the same type in the moving direction is equal to a pitch between the mover electrodes in the moving direction, and the mover includes at least two types of the mover electrodes having different lengths in the moving direction.

In the electrostatic actuator according to the present invention, the mover can be moved using a reduced number of electrical systems (phases).

For example, it is desirable that the number of phases of the electrical systems of the stator electrodes is three.

In the above-described means, since the number of the electrical systems can be reduced, the number of types of driving voltages applied to the electrical systems can be reduced. Accordingly, the configuration of the control unit and a method for controlling the electrostatic actuator can be simplified.

In addition, according to the present invention, the stator electrodes are arranged in the moving direction and in a width direction perpendicular to the moving direction in a brush shape, and the mover electrodes are arranged between pairs of the stator electrodes so as to form a brush shape.

In the above-described means, since a facing area between one of the stator electrodes and one of the mover electrodes is increased, the driving force can be increased.

According to the present invention, a method for controlling drive of any one of the above-described electrostatic actuators is provided. In the control method, a driving force for determining a displaced position of a mover is represented by a chevron curve and, while the driving force produced by a driving voltage previously provided is decreasing along the curve, the driving voltage is applied to the next electrical system.

In the above-described control method, even a reduced number of the electrical systems can provide a large driving force. Therefore, the mover can be driven with a high degree of accuracy and efficiency.

According to the present invention, a method for controlling drive of any one of the above-described electrostatic actuators is provided. In the control method, the driving voltage is applied to the stator electrodes disposed in front of and behind the mover electrode in the moving direction.

In the above-described control method, the mover can be stably and reliably supported on the stator at any position.

Advantages

In an electrostatic actuator according to the present invention, the number of phases of electrical systems to which driving voltages are applied can be reduced. In addition, the need for a negative power supply can be eliminated. Thus, the size and the costs can be reduced.

In addition, according to the present invention, in a method for controlling an electrostatic actuator, a mover can be driven by step drive control. Furthermore, when the mover stops moving, the mover can be reliably supported on a stator.

BRIEF DESCRIPTION OF DRAWINGS

FIG. 6 is a partial plan view illustrating the arrangement of electrodes of an electrostatic actuator according to a second embodiment of the present invention.

Reference Numerals

| | |
|---|---|
| 10 | electrostatic actuator |
| 20 | stator |
| 20a | stator counter surface |
| 21 | guide grooves (guiding means) |
| 22 | stator electrode group |
| 23 | stator electrode |
| 23a, 23a1, 23a2 | stator electrode (A-phase electrode) |
| 23b, 23b1, 23b2 | stator electrode (B-phase electrode) |
| 23c, 23c1, 23c2 | stator electrode (C-phase electrode) |
| 24 | conductive portions |
| 30 | mover |
| 30a | mover counter surface |
| 31 | guiding raised portion (guiding means) |
| 32 | mover electrode group |
| 33 | mover electrode |
| 33a, 33a1, 33a2 | first mover electrode |
| 33b, 33b1, 33b2 | second mover electrode |
| 33c, 33c1, 33c2 | third mover electrode |
| c1 | electrode-electrode pitch of mover between first mover electrode and second mover electrode |
| c2 | electrode-electrode pitch of mover between second mover electrode and third mover electrode |
| c3 | electrode-electrode pitch of mover between third mover electrode and the next first mover electrode |
| La | length of first mover electrode |
| Lb | length of second mover electrode |
| Lc | length of third mover electrode |
| L1 | length of stator |
| d1 | electrode-electrode distance of stator |
| P1 | pitch between stator electrodes |

BEST MODES FOR CARRYING OUT THE INVENTION

Figure 1:
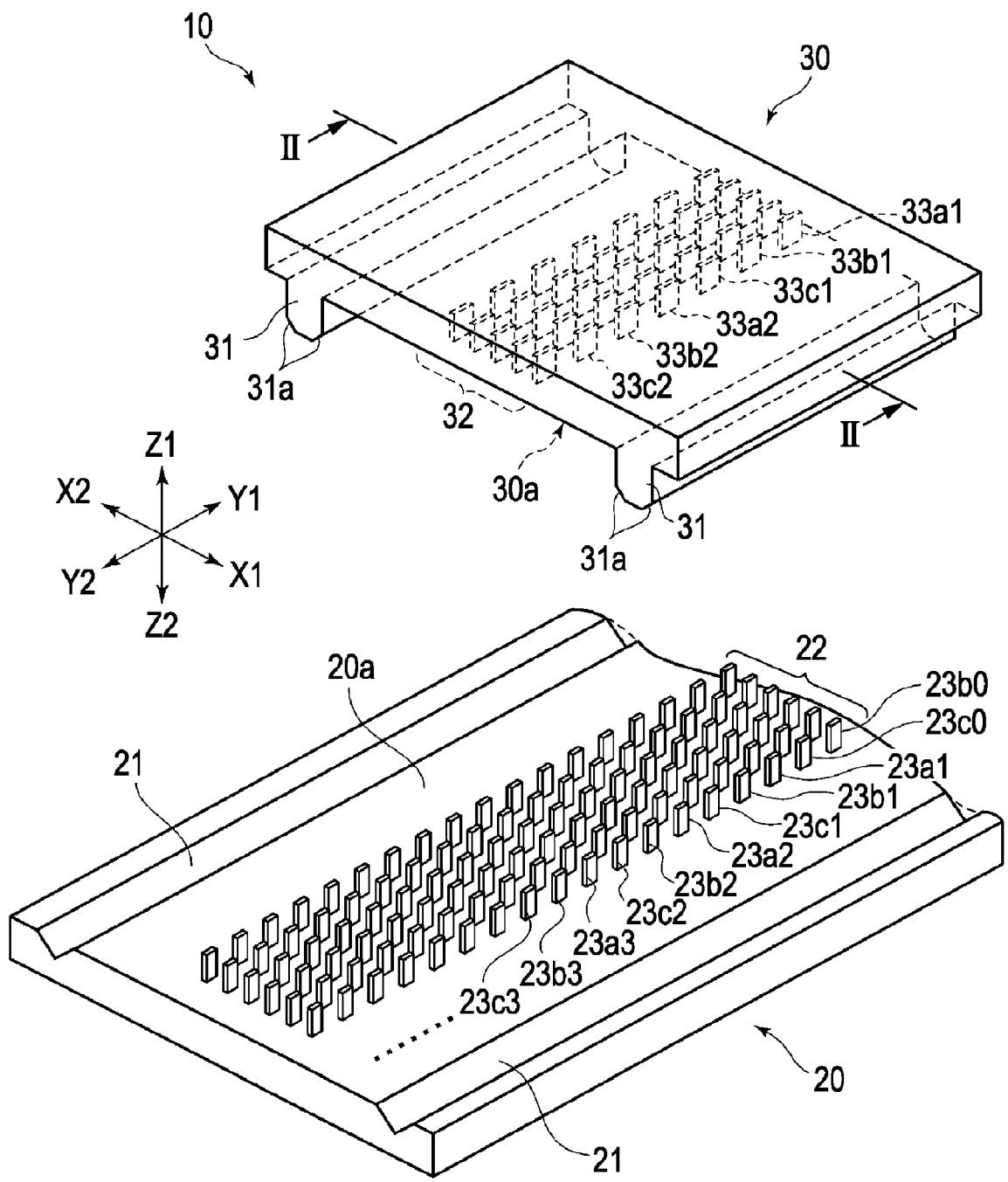
FIG. 1 is an exploded perspective view of an electrostatic actuator according to a first embodiment of the present invention.
Figure 2:
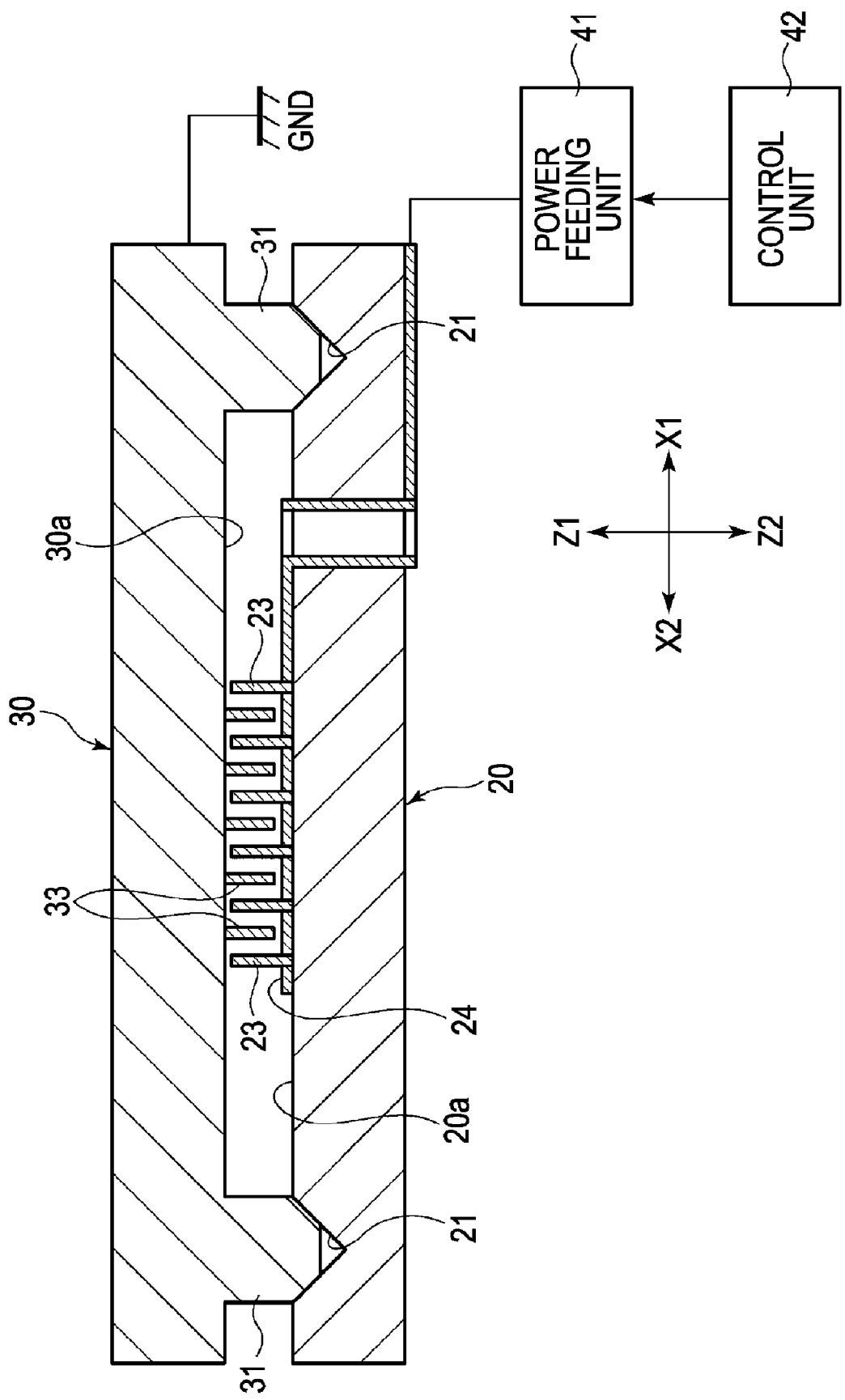
FIG. 2 is a cross-sectional view taken along a line II-II of FIG. 1 and illustrating a stator and a mover facing each other.
Figure 3:
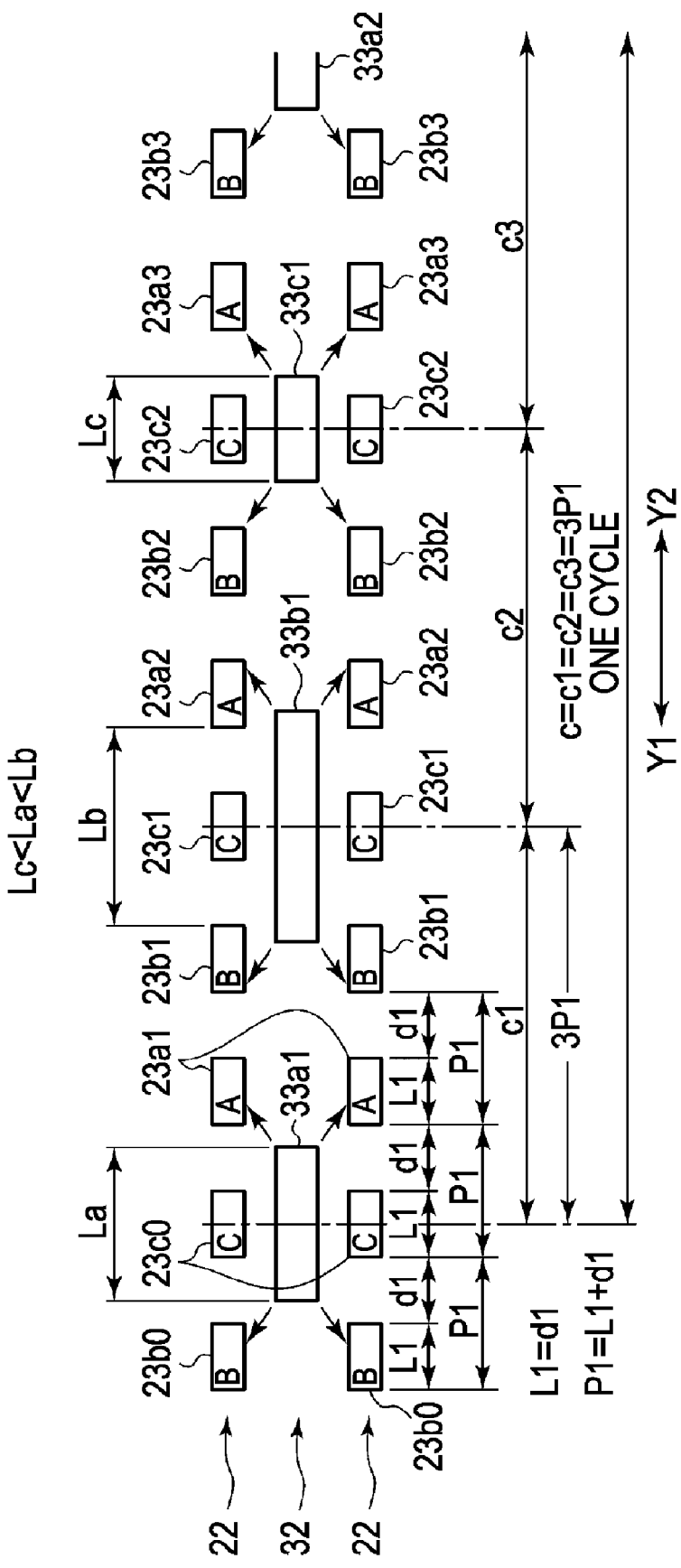
FIG. 3 is a partial plan view illustrating the arrangement of electrodes in an initial state of the electrostatic actuator according to the first embodiment.
Figure 4:
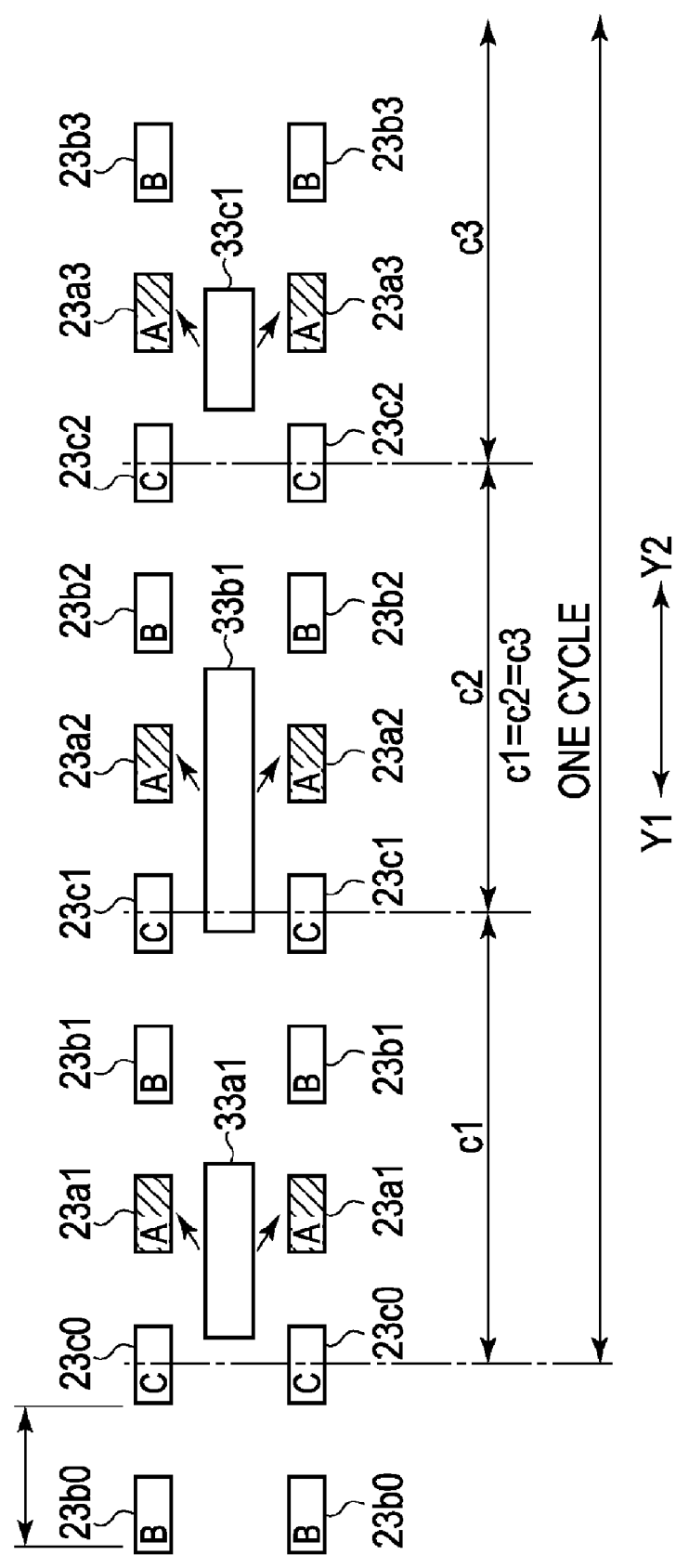
FIG. 4 is a plan view similar to FIG. 3, showing a state when the mover is moved from the position in the initial state after a driving voltage is applied to an A-phase electrode.
Figure 5:
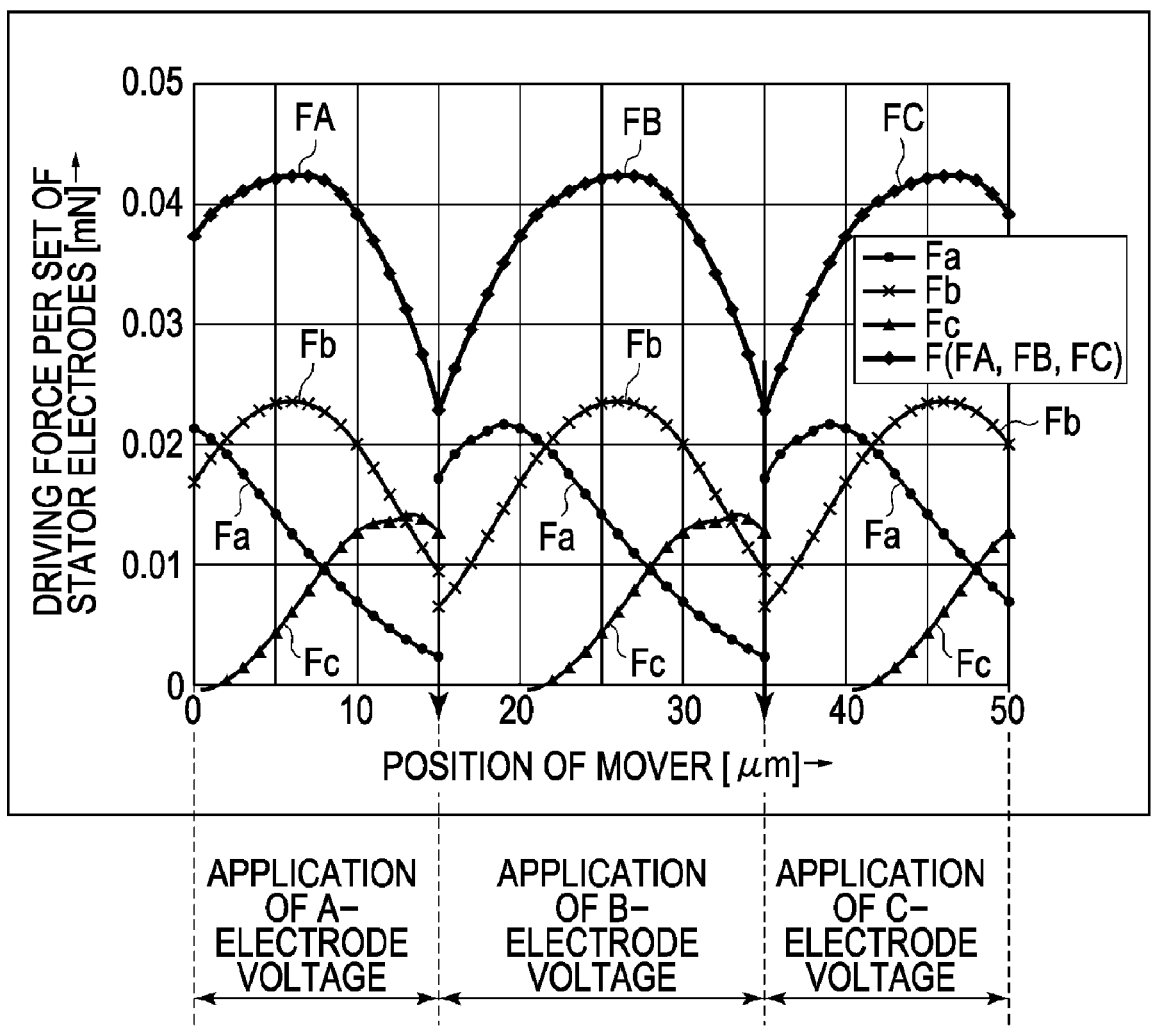
FIG. 5 is a graph illustrating a relationship between a displaced position of the mover and a driving force.

FIG. 1 is an exploded perspective view of an electrostatic actuator according to a first embodiment of the present invention. FIG. 2 is a cross-sectional view taken along a line II-II in FIG. 1 and illustrating a stator and a mover facing each other. FIG. 3 is a partial plan view illustrating an arrangement of electrodes in an initial state of the electrostatic actuator according to the first embodiment. FIG. 4 is a plan view similar to FIG. 3, showing a state after a driving voltage is applied to an A-phase electrode and the mover is moved from the position in the initial state. FIG. 5 is a graph illustrating a relationship between a displaced position of the mover and a driving force. Note that FIGS. 3 and 4 illustrate only one of n rows of the mover electrodes and stator electrodes disposed at either end of the row in the width direction. FIG. 5 illustrates a driving force per set of stator electrodes of a three-phase electrical system. In the drawings, the Y direction refers to a moving direction, the X direction refers to a width direction, and the Z direction refers to a height direction.

According to the present invention, as shown in FIG. 1, an electrostatic actuator 10 includes a stator 20 disposed on a Z2 side in the height direction and a mover 30 disposed on a Z1 side in the height direction.

The stator 20 is a plate-like member extending in the Y direction, which is a moving direction. Two guide grooves 21 and 21 each having a V-shaped cross section are formed in two end portions of a stator counter surface (a counter surface of the stator) 20a of the stator 20 in the width direction (the X direction) so as to extend in the moving direction (the Y direction). The stator counter surface 20a is directed to the Z1 direction. The surfaces of the guide grooves 21 and 21 are smooth surfaces having small friction resistance.

The length of the mover 30 in the moving direction is smaller than that of the stator 20. The mover 30 is formed from an electrical conductive material. The lower surface of the mover 30 serves as a counter surface (a mover counter surface) 30a. The mover counter surface 30a is directed in the Z2 direction. Alternatively, the mover 30 may be formed from an electrically insulating material. In such a case, an electrical conductive plate may be mounted on one of the surfaces (on the Z2 side) so as to form the counter surface (the mover counter surface) 30a.

Two raised portions 31 and 31 protruding in the Z2 direction are formed on two end portions of the mover counter surface 30a of the mover 30 in the width direction (the X direction) so as to extend in the moving direction (the Y direction). Two counter portions 31a and 31a each having a trapezoidal cross section are formed on the top ends of the raised portions 31 and 31 so as to face the guide grooves 21 and 21, respectively. Like the guide grooves 21 and 21, the counter portions 31a and 31a have smooth surfaces of small friction resistance.

When, as shown in FIG. 2, the stator counter surface 20a of the stator faces the mover counter surface 30a of the mover, the counter portions 31a and 31a of the two raised portions 31 and 31 are fittably inserted into the guide grooves 21 and 21, respectively. Thus, the electrostatic actuator 10 is assembled. In this position, if a force in the moving direction is applied to the mover 30, the mover 30 can be linearly moved in the Y direction (the moving direction). That is, according to the present embodiment, the guide grooves 21 and 21 and the raised portions 31 and 31 function as guiding means that leads the mover 30 in the moving direction.

Alternatively, as in the stator 20, two guide grooves each having a V-shape cross section may be formed in the mover 30 in place of the two raised portions 31 and 31. A plurality of spherical members (balls) may be disposed in the spaces formed when the guide grooves 21 and 21 of the stator 20 face the guide grooves of the mover 30. In such a case, since the balls roll in the spaces formed between the facing grooves, the mover 30 can be moved in the moving direction. Accordingly, in this case, the grooves and the balls can function as guiding means.

As shown in FIG. 1, a stator electrode group 22 including a plurality of plate-like stator electrodes 23 is formed on the stator counter surface 20a so that the stator electrodes 23 protrude in the Z1 direction.

Each of the stator electrodes 23 is formed by growth plating in which an electrical conductive metal, such as a copper, is vertically deposited in the Z direction. The stator electrodes 23 are formed so that the wider electrode surfaces are parallel to the moving direction (the Y direction), that is, the surfaces of the electrodes are perpendicular to the width direction. The plurality of stator electrodes 23 are arranged on the stator counter surface 20a at even intervals along the moving direction and at even intervals along the width direction so as to form a brush shape.

According to the present embodiment, as shown in FIG. 1, the stator electrodes 23 are arranged in six columns along the X direction (the width direction) and in n rows along the moving direction at a predetermined pitch. That is, the stator electrode group 22 having n rows and 6 columns is formed. However, it should be noted that the arrangement of the stator electrode group 22 is not limited to n rows and 6 columns described above. The array may be larger or smaller than this arrangement.

In addition, as shown in FIG. 2, a plurality of conductive portions 24 are formed on the stator counter surface 20a. That is, the plurality of conductive portions 24 are formed on base portions of the stator electrodes 23. The conductive portions 24 extend in the X direction and form n rows along the Y direction. The conductive portions 24 are electrically connected so that six stator electrodes 23 in each row have the same potential. Any two neighboring conductive portions 24 in the moving direction (the Y direction) are electrically isolated. The conductive portions 24 may be formed first and, subsequently, the stator electrodes 23 may be formed on the conductive portions 24 by growth plating.

The plurality of the conductive portions 24 are led out to outside the stator 20. A predetermined driving voltage is provided to the conductive portions 24 from a power feeding unit 41 disposed outside the stator 20.

According to the first embodiment, in the stator electrode group 22, every three conductive portions 24 arranged in the moving direction are connected to each other. Thus, the stator electrode group 22 includes A-phase electrodes composed of stator electrodes 23a (individually represented by stator electrodes 23a1, 23a2, 23a3 . . . ), B-phase electrodes composed of stator electrodes 23b (individually represented by stator electrodes 23b1, 23b2, . . . ), and C-phase electrodes composed of stator electrodes 23c (individually represented by stator electrodes 23c1, 23c2, . . . ). That is, as shown in FIG. 3, the stator electrode group 22 includes three types of electrical systems: the A-phase electrodes indicated by a symbol "A", the B-phase electrodes indicated by a symbol "B", and the C-phase electrodes indicated by a symbol "C". The number of the types is also referred to as "the number of electrical systems", "the number of phases", or "the number of poles". In the present embodiment, the number of types m=3.

The stator electrodes 23a1 of the A-phase electrodes, the stator electrodes 23b1 of the B-phase electrodes, and the stator electrodes 23c1 of the C-phase electrodes form a set of the stator electrodes of the three-phase electrical system. The stator electrodes 23a2, the stator electrodes 23b2, and the stator electrodes 23c2 form a set of the stator electrodes of the three-phase electrical system, and so forth.

The stator electrode group 22 is formed on the stator counter surface 20a of the stator 20 so that the stator electrode group 22 arranged in each column have the same potential, and the plurality of the electrical systems (the A-phase electrodes, the B-phase electrodes, and the C-phase electrodes) are arranged in a predetermined row order, repeatedly in the moving direction. In the present embodiment, the A-phase electrodes, the B-phase electrodes, and the C-phase electrodes are arranged in this order repeatedly in the moving direction.

As shown in FIG. 3, in the first embodiment, a length L1 of each of the stator electrodes 23 in the moving direction is a constant value. In addition, an electrode-electrode distance d1 between the neighboring electrodes in the moving direction is a constant value. The length L1 is equal to the electrode-electrode distance d1 (L1=d1). It follows that a pitch P1 (=L1+d1) of the stator electrodes is a constant value.

On the other hand, as shown in FIG. 1, a mover electrode group 32 including a plurality of plate-like mover electrodes 33 is formed on the counter surface (mover electrode surface) 30a of the mover 30 in a brush shape.

As in the stator 20, each of the mover electrodes 33 is formed by growth plating in which an electrical conductive metal, such as a copper, is vertically deposited in the Z direction. The mover electrodes 33 are formed so that the wider electrode surfaces are parallel to the moving direction (the Y direction). The plurality of mover electrodes 33 are arranged at even intervals along the moving direction and the width direction. All of the mover electrodes 33 are electrically connected on the counter surface (the mover counter surface) 30a so that the potentials of the mover electrodes 33 are the same.

According to the present embodiment, as shown in FIG. 3, the mover electrode group 32 includes three types of mover electrodes having different lengths: first mover electrodes 33a, second mover electrodes 33b, and third mover electrodes 33c. In the drawing, the first mover electrodes 33a include an electrode 33a1 and an electrode 33a2. The second mover electrodes 33b include a mover electrode 33b1 and a mover electrode 33b2. The third mover electrodes 33c include a mover electrode 33c1 and a mover electrode 33c2.

Let La be the length of each of the first mover electrodes 33a in the moving direction, Lb be the length of each of the second mover electrodes 33b in the moving direction, and Lc be the length of each of the third mover electrodes 33c in the moving direction. The lengths of the mover electrodes 33c, 33a, and 33b are in the increasing order of Lc<La<Lb. However, all of the electrode-electrode pitches are determined to be the same. That is, let c1 be the electrode-electrode pitch between the first mover electrode 33a1 and the second mover electrode 33b1, c2 be the electrode-electrode pitch between the second mover electrode 33b1 and the third mover electrode 33c1, and c3 be the electrode-electrode pitch between the third mover electrode 33c1 and the next first mover electrode 33a2. Then, c1=c2=c3=c.

In addition, according to the present embodiment, the electrode-electrode pitch c (c1, c2, or c3) is set to three times the pitch P1 (=L1+d1) between the stator electrodes (3·P1). That is, the electrode-electrode pitch c is set to the pitch (the cycle length) between the stator electrodes of the electrical system of the same type. For example, the electrode-electrode pitch c is set to the pitch of the A-phase electrodes, the pitch of the B-phase electrodes, or the pitch of the C-phase electrodes (c=3·P1). That is, let m be the number of phases of the stator (electrical systems). Then, the pitch c of the mover electrodes is set to a value of the pitch P1 of the stator electrodes multiplied by the number of phases (c=m·p1).

The pitch of the mover electrode group 32 for one cycle is equal to a distance between the first mover electrode 33a1 and the next first mover electrode 33a2 arranged in the moving direction (i.e., c1+c2+c3). Note that this distance is the same as the distance between the second mover electrode 33b1 and the next second mover electrode 33b2 or the distance between the third mover electrode 33c1 and the next third mover electrode 33c2.

As shown in FIG. 2, the mover 30 is stacked on the stator 20 such that the stator counter surface 20a faces the mover counter surface 30a. At that time, one of the mover electrodes 33 of the mover 30 is inserted between two neighboring stator electrodes 23 in the width direction. The electrode surface of one of the stator electrodes 23 of the stator 20 faces the electrode surface of one of the mover electrodes 33 of the mover 30 located by the side of the stator electrodes 23 in the width direction.

In the present embodiment, the mover electrode group 32 of the mover 30 is connected to ground GND. Here, the power feeding unit 41 and a control unit 42 are provided. The power feeding unit 41 applies a predetermined driving voltage to the stator electrodes 23a (23a1, 23a2 . . . ) that form the A phase, the stator electrodes 23b (23b1, 23b2 . . . ) that form the B phase, and the stator electrodes 23c (23c1, 23c2 . . . ) that form the C phase of the stator. The control unit 42 controls the timing at which the driving voltage is applied.

A method for controlling the electrostatic actuator in order to maintain the mover stationary is described first.

As shown in FIG. 3, in an initial state, the mover electrodes 33a1, 33b1, 33c1, 33a2 . . . of the mover 30 face the C-phase stator electrodes 23c0, 23c1, 23c2, 23c3 . . . of the stator, respectively.

The initial state can be set by applying a constant driving voltage to the stator electrodes 23a, 23b, and 23c of the stator 20 except for the C-phase stator electrodes 23c facing the mover electrodes 33a1, 33b1, 33c1, 33a2 . . . , that is, by applying the constant driving voltage to only the A-phase stator electrodes 23a and the B-phase stator electrodes 23b at the same time.

When the constant driving voltage is applied to the A-phase stator electrodes 23a and the B-phase stator electrodes 23b at the same time, the mover electrode 33a1 receives the same electrostatic attractive forces from the four stator electrodes disposed in the diagonal directions thereof, that is, from the B-phase stator electrodes 23b0 and 23b0 and the A-phase stator electrodes 23a1 and 23a1. Accordingly, the mover electrode 33a1 stays at a location at which the electrostatic attractive forces applied to the mover electrode 33a1 are balanced in the moving direction and the width direction, that is, at substantially the center point of the stator electrodes 23b0 and 23b0 that form the B phase and the stator electrodes 23a1 and 23a1 that form the A phase (the point equidistant from the stator electrodes 23b0 and 23b0 and the stator electrodes 23a1 and 23a1).

Similarly, the mover electrode 33b1 stays at substantially the center point of the stator electrodes 23b1 and 23b1 that form the B phase and the stator electrodes 23a2 and 23a2 that form the A phase (the point equidistant from the stator electrodes 23b1 and 23b1 and the stator electrodes 23a2 and 23a2). Still similarly, the mover electrode 33c1 stays at substantially the center point of the stator electrodes 23b2 and 23b2 that form the B phase and the stator electrodes 23a3 and 23a3 that form the A phase (the point equidistant from the stator electrodes 23b2 and 23b2 and the stator electrodes 23a3 and 23a3).

That is, in the initial state shown in FIG. 3, by applying a constant driving voltage to the stator electrodes 23a that form the A phase and a constant driving voltage to the stator electrodes 23b that form the B phase at the same time, electrostatic attractive forces are exerted between the mover electrodes 33a1, 33b1, 33c1, 33a2 . . . and the stator electrodes 23 in the moving direction and the width direction. Thus, the mover electrodes 33a1, 33b1, 33c1, 33a2 . . . and the stator electrodes 23 attract each other. In addition, since these electrostatic attractive forces cancel each other out, the electrostatic attractive forces are balanced. Therefore, when the mover 30 is caused to stop, the mover 30 can be reliably and stably maintained on the stator 20.

The control of driving the mover is described next.

When, in the initial state shown in FIG. 3, the driving voltage is applied to only the stator electrodes 23a that form the A phase, electrostatic attractive forces are exerted between each of the stator electrodes 23a1 and 23a1 and the mover electrode 33a1, between each of the stator electrodes 23a2 and 23a2 and the mover electrode 33b1, and between each of the stator electrodes 23a3 and 23a3 and the mover electrode 33c1 in the Y2 direction. Accordingly, the mover 30 can be moved in the Y2 direction (refer to FIG. 4).

At that time, as the mover 30 moves, the electrode-electrode distance and the facing area between each of the stator electrodes 23a (23a0, 23a1, 23a2, 23a3 . . . ) and the corresponding one of the mover electrodes 33 that face each other vary. Accordingly, the electrostatic attractive force (the driving force) exerted between each of the stator electrodes 23a and the corresponding one of the mover electrodes 33 varies.

For example, a relationship between the displacement distance and the driving force (the electrostatic attractive force) in such a case is shown in the left section (titled "APPLICATION OF A-ELECTRODE VOLTAGE") of FIG. 5. That is, an electrostatic attractive force Fa indicated by "●" is exerted between each of the stator electrodes 23a1 and 23a1 and the mover electrode 33a1. An electrostatic attractive force Fb indicated by "X" is exerted between each of the stator electrodes 23a2 and 23a2 and the mover electrode 33b1. An electrostatic attractive force Fc indicated by "▲" is exerted between each of the stator electrodes 23a3 and 23a3 and the mover electrode 33c1. Therefore, when a driving voltage is applied to the stator electrodes 23a that form the A phase, a driving force FA exerted to the whole mover 30 is represented by a sum (a resultant force) of the electrostatic attractive forces Fa, Fb, and Fc, and is represented by a chevron curve of substantially a quadratic function indicated by "♦". Hereinafter, this curve is referred to as a "chevron curve".

Similarly, a driving voltage is applied to only the stator electrodes 23b (23b0, 23b1, 23b2, 23b3 . . . ) that form the B phase, the mover 30 can be further moved in the Y2 direction. At that time, a relationship between the displacement distance of the mover 30 and a driving force FB is shown in the middle section of FIG. 5.

Subsequently, a driving voltage is applied to only the stator electrodes 23c (23c0, 23c1, 23c2, 23c3 . . . ) that form the C phase, the mover 30 can be further moved in the Y2 direction. At that time, a relationship between the displacement distance of the mover 30 and a driving force FC is shown in the right section of FIG. 5.

That is, in the electrostatic actuator according to the present embodiment, when a driving voltage is sequentially applied to the stator electrodes (A-phase electrodes) 23a that form the A phase, the stator electrodes (B-phase electrodes) 23b that form the B phase, and the stator electrodes (C-phase electrodes) 23c that form the C phase in order of the A phase, the B phase, the C phase, and the A phase, the driving forces FA, FB, and FC each having a chevron curve are produced. In this way, the mover 30 can be moved with a large driving force in the Y2 direction.

If the order of applying the driving voltage is reversed (i.e., in the order of the C phase, the B phase, the A phase, and the C phase), the driving forces FC, FB, and FA are produced in this order. Thus, the mover 30 can be moved in the opposite direction (the Y1 direction).

Accordingly, for example, when an object to be controlled and mounted on the mover 30 (e.g., a lens) is desired to be set at a predetermined location at a power-on time, the object can always be moved to the predetermined location by repeatedly applying the driving voltage a predetermined number of times.

In addition, as illustrated in FIG. 5, while the driving force FA is decreasing, the driving force FA is switched to the driving force FB by applying a driving voltage to the B-phase electrodes. In addition, while the driving force FB is decreasing, the driving force FB is switched to the driving force FC by applying a driving voltage to the next C-phase electrodes. In this way, the control unit 42 controls the power feeding unit 41 by switching the driving forces so that the next driving force is produced before each of the driving forces FA, FB, and FC becomes zero (reaches the dead point). Thus, the mover 30 can be driven in a continuous and smooth manner.

FIG. 6 is a partial plan view illustrating the arrangement of the electrodes of an electrostatic actuator according to a second embodiment of the present invention.

While the first embodiment has been described with reference to three types of mover electrodes: a mover electrodes 33a, 33b, and 33c having different lengths, an electrostatic actuator according to the second embodiment includes two types of mover electrodes having different lengths: mover electrodes 33a (individually represented by 33a1, 33a2 . . . ) and mover electrodes 33b (individually represented by 33b1, 33b2 . . . ).

That is, let c1 be the electrode-electrode distance between the mover electrode 33a1 and the mover electrode 33b1, and c2 be the electrode-electrode distance between the mover electrode 33b1 and the mover electrode 33a2. Then, these electrode-electrode distances are determined to be the same (c1=c2=c).

In addition, an electrode-electrode pitch c (c1 or c2) is set to three times the pitch P1 (=L1+d1) between the stator electrodes (c=3·P1). That is, let m be the number of phases of the stator (electrical systems). Then, the electrode-electrode pitch c of the mover is set to a value of the pitch P1 between the stator electrodes multiplied by the number of phases (c=m·p1).

The pitch of the mover electrode group 32 for one cycle is equal to a distance (c1+c2) between the mover electrode 33a1 and the next mover electrode 33a2 arranged in the moving direction and between the mover electrode 33b1 and the mover electrode 33b2.

The number of electrical systems of the stator electrodes (three phases) and the other structures are similar to those of the first embodiment.

As described above, even in the case where two types of the mover electrodes having different lengths: the mover electrodes 33a (individually represented by 33a1, 33a2, . . . ) and the mover electrodes 33b (individually represented by 33b1, 33b2, . . . ) are employed, when a predetermined driving voltage is applied to the stator electrodes 23a that form the A phase and the stator electrodes 23c that form the C phase at the same time, the same electrostatic attractive force are exerted to each of the mover electrodes 33 in the moving direction and the width direction. Thus, each of the mover electrodes 33 is attracted. Since the electrostatic attractive forces cancel each other out, the electrostatic attractive forces are balanced. Consequently, as in the first embodiment, the mover can be reliably and stably maintained.

While the first and second embodiments have been described with reference to two or three types of the mover electrodes 33 of the electrostatic actuators having different lengths and disposed in one pitch (cycle), the present invention is not limited thereto. For example, four or more types of mover electrodes may be employed.

In addition, while the first and second embodiments have been described with reference to the stator electrodes and mover electrodes having a brush shape, the present invention is not limited thereto. For example, planar belt-shaped electrodes disposed perpendicular to the moving direction may be employed. However, in such a case, the width of the belt-shaped electrode disposed perpendicular to the moving direction is equal to the length of a mover in the moving direction.

The invention claimed is:

1. An electrostatic actuator comprising:
   a stator having a plurality of stator electrodes arranged thereon;
   a mover having a plurality of mover electrodes arranged thereon, the mover moving in a predetermined moving direction with a surface thereof facing a surface of the stator;
   a power feeding unit for applying a predetermined driving voltage to the stator electrodes; and
   a control unit for controlling the power feeding unit;
   wherein the stator electrodes include a plurality of electrical systems repeatedly arranged in a predetermined order in the moving direction, a pitch of the stator electrodes forming the electrical systems of the same type in the moving direction is equal to a pitch of the mover electrodes in the moving direction, and wherein the mover includes at least two types of the mover electrodes having different lengths in the moving direction.

2. The electrostatic actuator according to claim 1, wherein the stator electrodes are arranged in the moving direction and in a width direction perpendicular to the moving direction in a brush shape, and the mover electrodes are arranged between pairs of the stator electrodes so as to form a brush shape.

3. The electrostatic actuator according to claim 1, wherein the number of phases of the electrical systems of the stator electrodes is three.

4. A method for controlling drive of the electrostatic actuator according to claim 1, wherein a driving force for determining a displaced position of a mover is represented by a chevron curve and wherein, while the driving force produced by a driving voltage previously provided is decreasing along the curve, the driving voltage is applied to the next electrical system.

5. A method for controlling drive of the electrostatic actuator according to claim 1, wherein the driving voltage is applied to the stator electrodes disposed in front of and behind the mover electrode in the moving direction.

* * * * *